(12) United States Patent
Kilgore et al.

(10) Patent No.: US 6,230,685 B1
(45) Date of Patent: May 15, 2001

(54) PRESSURE PULSATION DAMPER CONTAINING A FREE FLOATING SPACER

(75) Inventors: Jason T. Kilgore, Newport News; Barry S. Robinson; Jan L. Bennett, both of Williamsburg, all of VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/438,291

(22) Filed: Nov. 12, 1999

(51) Int. Cl.⁷ .................................................. F02M 41/00
(52) U.S. Cl. .............................................. 123/467; 138/30
(58) Field of Search ..................................... 123/467, 447, 123/468–9, 470; 138/30; 137/510

(56) References Cited

U.S. PATENT DOCUMENTS

| | | | |
|---|---|---|---|
| 4,373,872 | * 2/1983 | Kemmer et al. | 138/30 |
| 4,679,537 | * 7/1987 | Fehrenbach et al. | 123/447 |
| 4,896,867 | * 1/1990 | Schyboll et al. | 138/30 |
| 4,921,004 | * 5/1990 | Lane et al. | 138/30 |
| 5,088,463 | * 2/1992 | Affeldt et al. | 123/447 |
| 5,832,904 | * 11/1998 | Morishita et al. | 123/447 |
| 5,934,251 | * 8/1999 | Jacobs | 123/447 |
| 5,954,031 | * 9/1999 | Ogiso et al. | 123/467 |
| 6,032,651 | * 3/2000 | Field | 123/467 |

* cited by examiner

Primary Examiner—Thomas N. Moulis

(57) ABSTRACT

A fuel system damper is provided having a housing which is separated by a diaphragm into first and second chambers. The first chamber is sealed and contains a spring biased toward the diaphragm. The second chamber has an opening to allow fuel from a fuel rail to enter the damper and contact the diaphragm. The second chamber includes a radial shoulder that maximizes an effective area of the diaphragm. A spacer is disposed in the second chamber that engages the diaphragm to prevent the diaphragm from contacting the radial shoulder. The spacer maintains the diaphragm in a position to provide the maximum effective area of the diaphragm.

17 Claims, 2 Drawing Sheets

PRESSURE PULSATION DAMPER CONTAINING A FREE FLOATING SPACER

FIELD OF INVENTION

This invention relates to a damper for automotive fuel systems, and more particularly to a damper for minimizing fuel pressure pulsations in a fuel rail.

BACKGROUND OF INVENTION

Existing fuel delivery systems which use an in-tank fuel pressure regulator usually employ an energy absorbing device mounted on or near the fuel rail. The energy absorbing device serves to compensate for fuel pressure pulsations created in the fuel rail that occur as a result of sequential firing of fuel injectors operatively connected to the fuel rail.

A known energy absorbing device is a damper mounted on the fuel rail. A damper of this type is disclosed in commonly-assigned, co-pending U.S. patent application Ser. No. 09/086,084, entitled "Fuel Rail Damper", filed, May 28, 1998, which is incorporated herein in its entirety by reference. This known damper has an upper chamber and a lower chamber separated by a solid, flexible diaphragm. The upper chamber contains a spring biased against the diaphragm. The lower chamber has an opening which allows fuel to enter from the fuel rail and contact the diaphragm. An upper flange of the lower chamber extends inwardly at an angle to form a radial shoulder, which maximizes an effective area of the diaphragm. Under certain operative conditions, the diaphragm can adhere to the radial shoulder, which substantially reduces the effective area of the diaphragm, and can cause the diaphragm to become non-responsive to pressure pulses. Thus, the radial shoulder, which is employed to maximize the effective area of the diaphragm, can, under certain conditions, actually minimize the operability of the damper.

SUMMARY OF THE INVENTION

The present invention provides a damper for a fuel system having a housing which is separated by a diaphragm into a first chamber and a second chamber. The first chamber is sealed and contains a spring biased toward the diaphragm. The second chamber has an opening to allow fuel from the fuel rail to enter the damper and contact the diaphragm. The second chamber includes a radial shoulder that maximizes the effective area of the diaphragm. A spacer is disposed in the second chamber that prevents the diaphragm from contacting the radial shoulder. The spacer, therefore, maintains the diaphragm in a position which ensures that the maximum effective area of the diaphragm is exposed to fuel in the second chamber. To assist the spacer, a seat, that supports the spring, is disposed in the first chamber, and on the opposite side of the diaphragm from the spacer.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
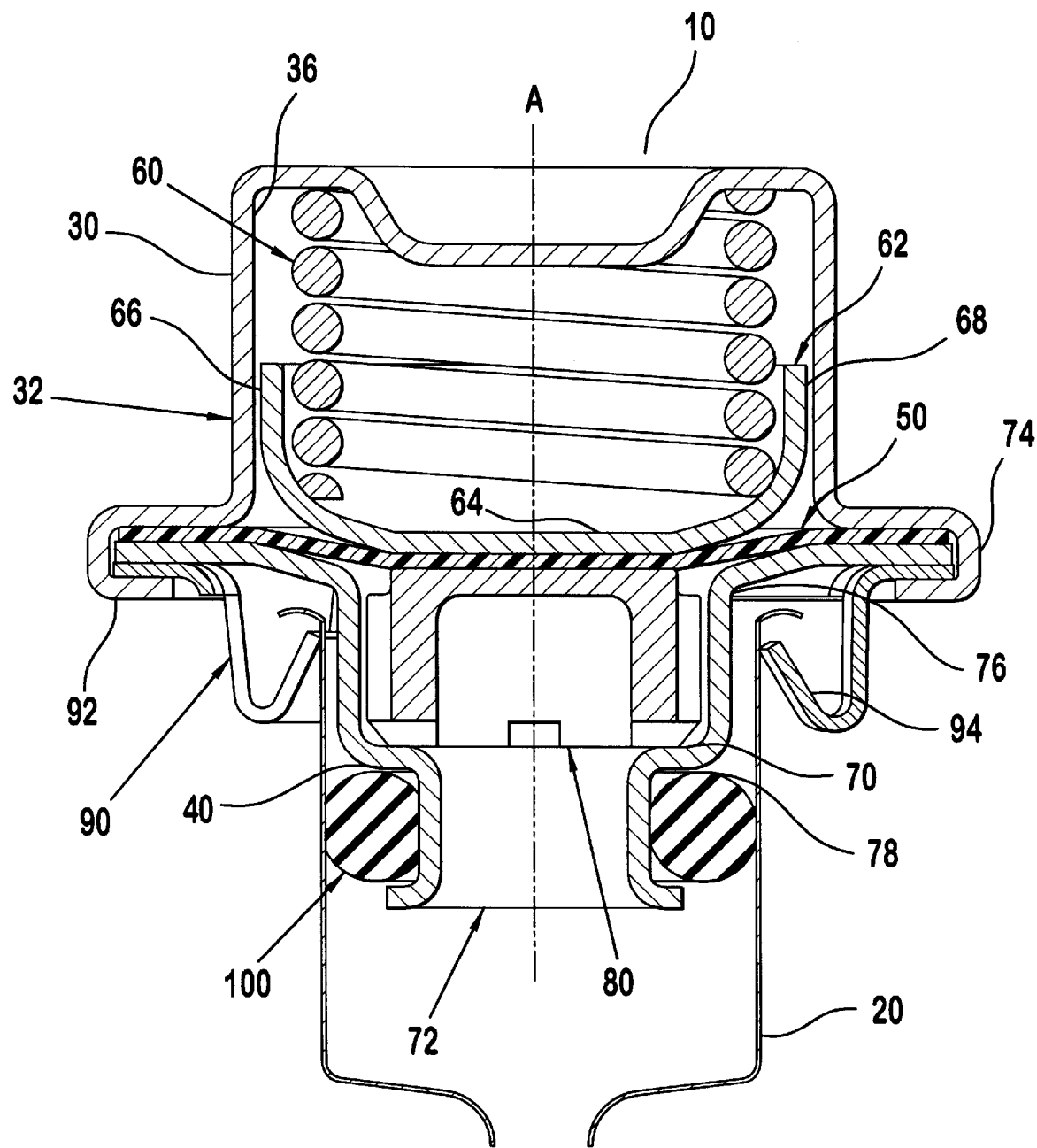
FIG. 1 is a cross-sectional view of an embodiment of the damper of the present invention.

FIG. 1 illustrates a preferred embodiment of the damper 10 that attenuates pressure pulsations in a fuel system. The damper 10 is, preferably, an assembly of components operatively attached to a fuel rail (not shown) by a fuel rail cup 20. The damper 10 includes an upper chamber 30, a first chamber, and the lower chamber 40, a second chamber. The upper chamber 30 and the lower chamber 40 are separated by a flexible diaphragm 50 within the damper assembly. The diaphragm 50 is secured in place between the upper chamber 30 and lower chamber 40. The upper chamber 30 is formed by a first member of the assembly, which is, preferably, a cover 32 that creates a sealed chamber with the diaphragm 50. A biasing device, which is, preferably, a spring 60, and a retainer for the biasing device, which is, preferably, a spring seat 62, are disposed in the upper chamber 30. The spring seat 62 engages the diaphragm 50 so that the spring 60 biases the diaphragm 50 toward the lower chamber 40.

A spacer 80 is disposed in the lower chamber 40 and contacts a seat 78 formed in the housing 70. The seat 78 limits axial movement of the spacer 80 toward an opening 72. The force of spring 60 limits axial movement of the spacer 80 toward the cover 32. The height of the spacer 80, in the axial direction along the longitudinal axis A, is greater than the distance between the seat 78 and an inner edge of the radial shoulder 76, and, preferably, is greater than the distance between the seat 78 and the flange 74. The spacer 80, therefore, prevents contact between the diaphragm 50 and the radial shoulder 76. Because contact is prevented between the diaphragm 50 and the radial shoulder 76, the diaphragm 50 does not adhere to the radial shoulder 76, even after prolonged exposure to heat and fuel. By avoiding contact with the radial shoulder 76, a maximum effective area of the diaphragm 50 is continually exposed to the lower chamber 40.

Figure 2:
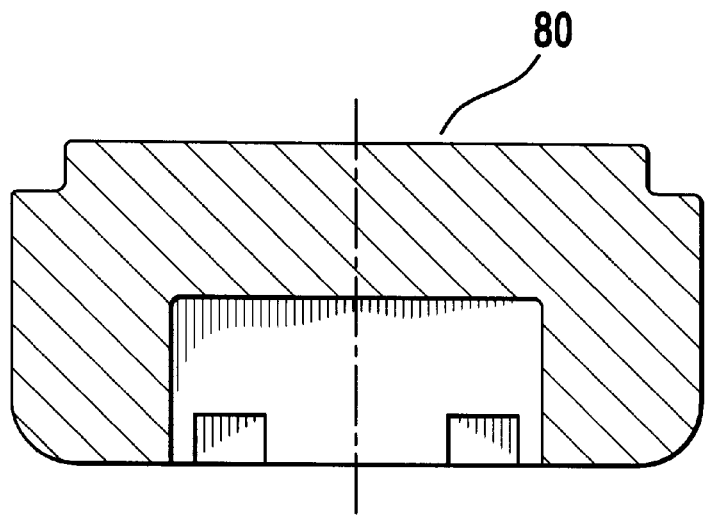
FIG. 2 is a cross-sectional view of an embodiment of the spacer of the present invention.
Figure 3:
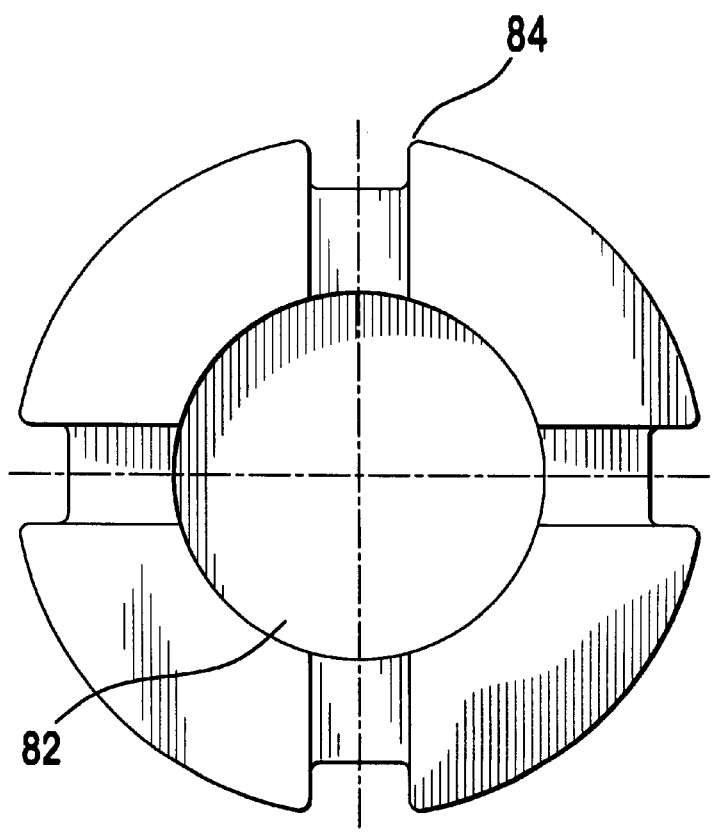
FIG. 3 is a plan view of an embodiment of the spacer of the present invention.

The spacer 80, as shown in FIGS. 2 and 3, is, preferably, a substantially cylindrical member with an interior aperture 82 and a plurality of grooves 84 in an outer surface of the substantially cylindrical member. The outer surface serves as a first surface of the spacer 80. The interior aperture 82 communicates with the grooves 84 so that fuel can flow from the interior aperture 82 toward the diaphragm 50 during various operative conditions. The fuel flow allows the spacer 80 to float freely in the lower chamber 40. It should be noted, however, that during certain conditions, particularly, a hot soak condition, the surface of the spacer 80 exposed to the diaphragm 50 may adhere to the diaphragm 50. If the spacer 80 adheres to the diaphragm 50, an operative area of the diaphragm 50 is maintained or increased because of the surface area of the interior aperture 82, a second surface of the spacer, and the outer surface area of the spacer 80 exposed to the opening 72, and, because the spacer 80 ensures that the diaphragm 50 does not engage the radial shoulder 76. Irrespective of the spacer 80 adhering to the damper 50, experimental tests have shown that the spacer 80 substantially increases the damping ratio of the damper 10 during conditions, such at hot soak, when, if the spacer 80 was not present, the diaphragm 50 could adhere to the radial shoulder 76. The spacer 80 maintains the diaphragm 50 free from engagement with the radial shoulder 76 during all operative conditions. Thus, the spacer 80 in the damper 10 maximizes the effective area of the diaphragm 50 during all operative conditions.

The spring seat 62 is a cup-shaped member with a diaphragm engagement face 64. The engagement face 64 is connected to a lateral side surface 66 by a rounded outer edge 68. Further details of the spring seat are described in co-pending U.S. application Ser. No. 09/432,573, entitled "Damper Containing Internal Lubricant", which is hereby incorporated in its entirety by reference. The engagement face 64 of the spring seat 62 and a surface of the spacer 80 provide opposing structural members that apply opposite axial loads along longitudinal axis A to the diaphragm 50. The engagement face 64 has a contact area less than an effective contact area of the diaphragm 50, due to the rounded outer edge 68. By providing the engagement face 64 with this configuration, the spring seat 62 biases the diaphragm 50 without biasing the spring seat 62 against the radial shoulder. Thus, both the spring seat 62 and the spacer 80 provide a method of locating the diaphragm 50 in a position that ensures the diaphragm 50 avoids contact with the radial shoulder 76, and, that ensures the maximum effective area of the diaphragm 50 is exposed to lower chamber 40.

The damper 10 is attached to the fuel cup 20 by a clip 90 comprising a support portion 92 on an outer diameter and a plurality of retention members 94 on an inner diameter. Further details of this clip are disclosed in commonly-assigned, co-pending U.S. patent application Ser. No. 09/086,084, entitled "Fuel Rail Damper", filed May 28, 1998, which is hereby incorporated in its entirety by reference. The support portion 92 of the clip 90 is disposed between the flange 74 of the housing 70 and a flange end of the cover 32. The clip retention members 94 extend over a lip on the fuel cup 20 to maintain the damper 10 in place on the fuel cup 20. An O-ring 100, disposed on the housing 70, provides a seal between the damper 10 and the fuel cup 20.

p While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What we claim is:

1. A damper for a fuel system, comprising:
   a housing having a first end that receives fuel, and a second end axially displaced from the first end;
   a diaphragm proximate the second end;
   a spring biasing the diaphragm toward the first end;
   a spacer having a first surface engaging the diaphragm and a second surface exposed to the first housing end; and
   wherein the spacer comprises a substantially cylindrical member with an interior aperture.

2. The damper of claim 1, wherein the housing comprises a seat disposed between the first end and the spacer.

3. The damper of claim 2, wherein movement of the spacer is limited in a first axial direction by the seat and in a second axial direction by the spring.

4. The damper of claim 1, wherein the housing comprises a radial shoulder adjacent the diaphragm, the radial shoulder having an inwardly angled portion.

5. The damper of claim 4, wherein the spacer engages the housing so that the diaphragm and the radial shoulder avoid contact.

6. The damper of claim 1, wherein an outer surface of the cylindrical member includes at least one groove that communicates with the interior aperture.

7. The damper of claim 1, further comprising:
   a spring seat disposed between the spring and the diaphragm.

8. A damper for a fuel system, the damper comprising:
   a housing;
   a diaphragm separating the housing into a sealed first chamber and a second chamber, the second chamber having a fuel receiving opening;
   a spring seat disposed in the first chamber in contact with the diaphragm;
   a spring biasing the spring seat toward the diaphragm;
   a spacer disposed in the second chamber, the spacer including a first surface configured to engage the diaphragm, and a second surface exposed to the fuel receiving opening; and
   wherein the spacer comprises a cylindrical member with an interior aperture, the substantially cylindrical member having an outer surface that serves as the first surface of the spacer, and the interior aperture that serves as the second surface of the spacer.

9. The damper of claim 8, wherein the outer surface of the cylindrical member includes at least one groove that communicates with the interior aperture.

10. The damper of claim 9, wherein the at least one groove comprises four grooves uniformly spaced about the outer surface of the cylindrical member.

11. The damper of claim 8, wherein the housing includes a retention device, the retention device being configured to secure the damper to a fuel rail cup.

12. The damper of claim 11, wherein the retention device comprises a sheet metal clip integrally attached to the housing.

13. The damper of claim 12, wherein the housing comprises a first member that provides the sealed first chamber and a second member that provides the fuel receiving opening, the first member including a first flange, the second member including a second flange; and
   wherein the clip includes a support portion and a plurality of retention members, the support portion being disposed between the first flange and the second flange, and the plurality of retention members extending from the support member toward the fuel receiving opening.

14. The damper of claim 8, wherein the second chamber comprises:
   an inwardly angled radial shoulder adjacent the diaphragm.

15. The damper of claim 8, wherein the spring seat comprises a substantially cup-shaped member, the cup-shaped member having a face that engages the diaphragm, the face having a contact area less than an effective area of the diaphragm.

16. A method of damping pressure pulsations in a fuel system, comprising the steps of:
   providing a housing having an inwardly angled radial shoulder;
   separating the housing into a first chamber and a second chamber with a diaphragm, the second chamber having a fuel receiving opening;
   disposing a structural member in each of the first chamber and the second chamber so that the diaphragm avoids contact with the shoulder; and
   wherein the structural member in the second chamber comprises a spacer having an interior aperture and at least one groove in communication with the aperture.

17. The method of claim 16, wherein the structural member in the first chamber comprises a spring seat having a face with a contact area less than the effective area of the diaphragm.

* * * * *